June 13, 1944. H. MERRETT 2,351,355
GRIPPING AND SUPPORTING DEVICE SUITABLE
FOR SUPPORTING VEHICLE WHEELS
Filed May 23, 1942
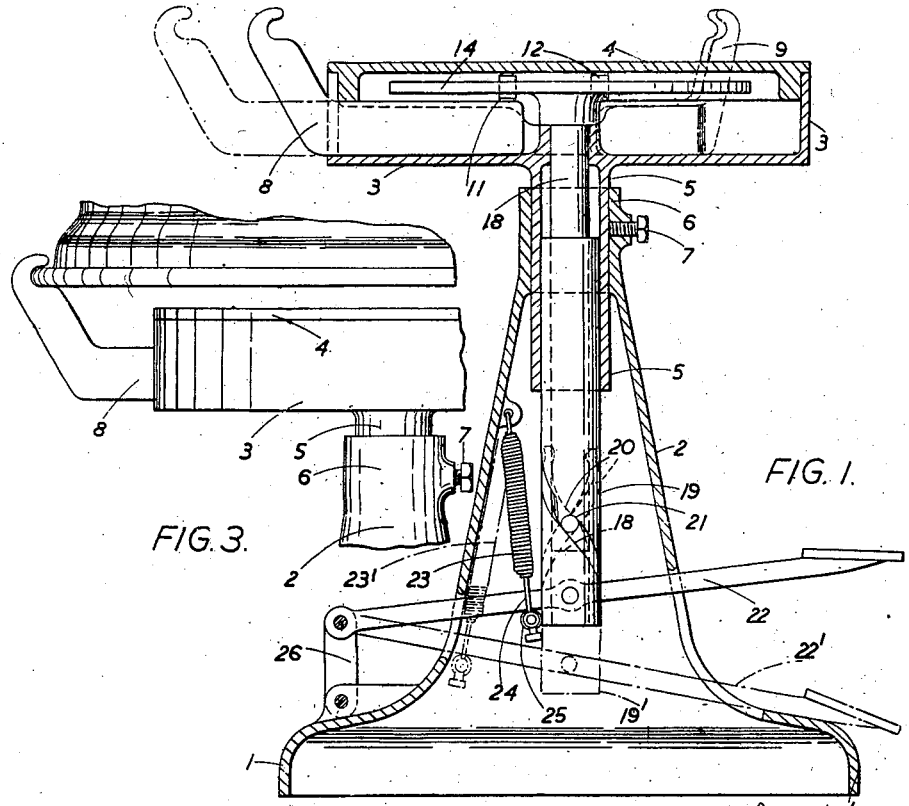
FIG. 1.
FIG. 3.
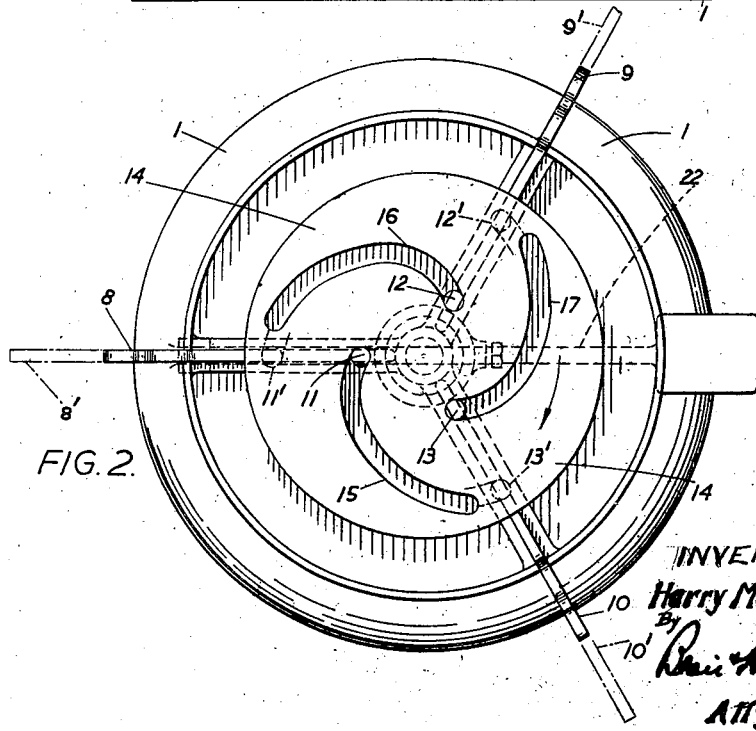
FIG. 2.
INVENTOR
Harry Merrett
By
Attys Patented June 13, 1944

2,351,355

UNITED STATES PATENT OFFICE 2,351,355

GRIPPING AND SUPPORTING DEVICE SUITABLE FOR SUPPORTING VEHICLE WHEELS

Harry Merrett, Dairymoor, Wickham, England

Application May 23, 1942, Serial No. 444,280
In Great Britain June 12, 1941

3 Claims. (Cl. 144—288)

This invention relates to improvements in or relating to gripping and supporting devices suitable for supporting a vehicle wheel during tyre applying and removing operations.

When changing the tyre on a vehicle wheel it is at present the usual practice to remove the wheel from the vehicle and then place such wheel on the ground. The wheel is thus located in a position wherein manipulation of the necessary tyre levers or the like is difficult owing to the position which has to be assumed by the operator and the fact that the tyre levers frequently make contact with the ground before they have been turned to a sufficient extent for freeing the tyre and moreover there is a tendency for the wheel to slip about, the whole operation usually being one of great inconvenience. A further difficulty arises on account of the fact that whilst the wheel is lying on the ground the tyre cannot be moved downwardly from the rim and indeed there is difficulty in keeping the tyre even approximately in its central position as the side wall of a tyre usually projects to a material extent beyond the side of the wheel so that when the side of the latter is grounded the tyre is urged upwardly.

One of the objects of the present invention is to provide a simple and efficient gripping or supporting device with the aid of which the abovementioned difficulties in tyre applying and removing operations may be wholly avoided or very greatly reduced.

A further object is to provide a wheel gripping device for facilitating the fitting and removal of a tyre wherein the gripping mechanism is entirely operable by foot controlled means so leaving the operator's hands free for manipulation of the wheel.

A more specific object is to provide a gripping and supporting device suitable for supporting wheels during tyre fitting or removing operations comprising a platform, a plurality of gripping elements movably mounted with respect to said platform and means preferably operable by a pedal for moving said gripping devices into and out of their gripping positions.

With the above and other objects in view the present invention resides in the construction hereinafter described and claimed in the appended claims.

A device according to the present invention may be in the form of a platform upon which a wheel may be rested and such platform may be mounted on any suitable pedestal or stand so that it is supported at a convenient distance from the ground and such device may be of a transportable nature or it may be secured to the floor. In cases where it is desired that the device be transportable yet very rigid when in use the aforesaid pedestal may be secured to a flat base on which a user of the device may stand so that he may employ his own weight for opposing any inadvertent movement of the device.

The aforesaid platform may be mounted at any desired height from the ground and such height may be variable if desired, for instance by the use of a telescopic pillar for mounting said platform on its pedestal, stand or the like. The aforesaid platform may of course be of any desired shape and dimensions, although for use in connection with the removal and fitting of vehicle tyres it is advantageously of circular form and of a diameter somewhat smaller than the diameter of the smallest wheel likely to be encountered.

The aforesaid gripping elements, of which there may be any desired number, may be adapted to be moved, through any desired range of movement. Thus, for instance, in the case of a stand for facilitating the changing of tyres on the wheels of road vehicles said elements may be adapted to move radially through a range appropriate for enabling a wheel of any of the usual sizes to be gripped.

The means for moving the aforesaid gripping elements are preferably irreversible in the sense that pressure on said elements in a releasing direction cannot by itself effect any movement of such elements. Thus, for instance, such elements may be controlled by suitably contoured cams, cam grooves or the like.

In general I prefer to rely upon spring pressure for urging the aforesaid gripping elements into their gripping positions and to employ positive control means, for instance, a foot pedal, operable against said spring pressure for moving said gripping elements in a releasing direction. In such cases I preferably adopt control mechanism associated with one or more springs in such a way that the pressure urging said gripping elements in a gripping direction is more or less uniform irrespective of whether said elements are approaching the outermost or innermost limits of their range of movement. Thus, for instance, I may employ a foot lever pivoted at one end to the base of the device, for instance through the medium of a compensating link and I may provide a spring anchored to the device at one end and connected to said lever by means of a roller adapted to track therealong, said lever being so disposed that in its uppermost position the angle of upward inclination with respect to the horizontal is equal to the angle of downward inclination when such lever is fully depressed. In this way the point of engagement of the spring will tend to move along the lever towards the pivot point of the lever as the latter is depressed so avoiding elongation of the spring by an amount equal to the movement of the original point of engagement and moreover the force applied to the pedal in an upward direction may be substantially constant.

In general the aforesaid platform will be horizontally disposed and the control lever will be movable in a vertical plane and it becomes necessary to convert vertical movement of said lever into horizontal movement of the gripping elements associated with said platform. This conversion may be obtained in any suitable way, but I find that in many cases it is advantageous to employ a rotary control plate having cam grooves therein for engaging and controlling the gripping elements and to effect rotation of said plate pursuant to movement of said lever by means of a tube connected to said lever and having an inclined or helical slot in its wall making engagement with a pin extending laterally through a shaft depending from said control plate. With such an arrangement provision may be made if desired for rotating the head of the device, i. e. the assembly consisting of the supporting platform and gripping devices, so as to vary its relative position with respect to the control plate and so adjust the position of the gripping elements irrespective of the position of the control lever. In this way provision can be made for taking up any wear of the parts and/or the range of movement of the gripping elements can be varied.

In order that the present invention may be well understood I will now describe, by way of example only, one embodiment thereof with reference to the accompanying drawing in which:

Figure 1 is a front cross-sectional elevation of the device,

Figure 2 is a plan view of the device shown in Figure 1 but with the top member removed and Figure 3 is a broken front elevation of an upper part of the device with a part of a wheel gripped thereby.

Referring to the figures the device includes a base 1 having an upwardly extending hollow pedestal 2 surmounted by a circular platform 4. The said platform is of a diameter which is slightly less than the diameter of the smallest wheel to be accommodated and the part 3 thereof is provided with a downwardly extending sleeve 5 adapted to be received within and supported by the hollow pedestal 2.

The aforesaid sleeve 5 is preferably slidably and/or angularly adjustable with respect to the sleeve and any suitable means may be provided for locking such parts in a desired position. Thus for instance the sleeve 5 may be slidable and rotatable in the part 6 of the pedestal and a set screw 7 may extend through said part 6 and be adapted to lock said parts 5 and 6 in any desired position of adjustment.

Three gripping elements 8, 9, 10 are slidably mounted in grooves or guideways extending radially through the casing 3 and displaced by 120° with respect to one another; said grooves or guideways may be formed in the casing 3 by suitably displaced webs and the latter may for instance be cast integrally with the casing 3.

The gripping elements 8, 9, 10 have horizontal body portions of rectangular cross section for engagement with the aforesaid grooves or guideways and outwardly and upwardly extending end portions provided with inwardly directed hook-like extremities. These hook-like extremities are suitably shaped for making engagement with the rim of a wheel for instance in the manner indicated in Figure 3 of drawing and they are located on a level which is higher than that of the platform 3, 4 by an amount sufficient to accommodate any lateral projection of the wheel hub beyond its rim periphery.

Rollers 11, 12 and 13, rotatable about vertical axes, extend from the aforesaid gripping elements 8, 9 and 10 and make engagement with a control plate 14 located inside the casing 3. Said control plate is provided with three symmetrically disposed cam-like slots 15, 16, 17, the slot 15 receiving the roller 11, the slot 16 receiving the roller 12 and the slot 17 receiving the roller 13.

The aforesaid slots 15, 16 and 17 are curved outwardly from points adjacent to the centre of the control plate 14 to points adjacent to the periphery thereof and it will be appreciated therefore that rotation of the control plate in the direction of the arrow shown in Figure 2 will cause the gripping elements to move outwardly in radial directions and that rotation in the opposite direction will cause said elements to move radially inwards. The curvature of the aforesaid slots 15, 16 and 17 is preferably such that outward pressure on the gripping elements cannot by itself cause the control plate 14 to rotate and inadvertent movement in a releasing direction is thereby positively prevented.

The aforesaid control plate 14 is provided with a downwardly extending shaft 18 passing through the sleeve 5 and into the hollow interior of the pedestal 2, the diameter of said shaft being less than the internal diameter of the sleeve 5 so that an annular space is formed between such parts.

An operating tube 19 is passed over the shaft 18 and is of such dimensions that it is slidingly received in the above-mentioned annular space between the parts 18 and 5. This tube is provided with two opposed inclined or helical slots, one of which is shown in Figure 1 and designated 20, and a pin 21 extending laterally through the shaft 18 makes engagement with these slots. If desired anti-friction sleeves, races or the like may be interposed between the pin 21 and the slots with which it makes engagement and ball races or the like may be located between the bearing surfaces of the parts 5, 19 and 18.

The aforesaid operating tube 19 is pivoted at its lower end to a pedal lever 22 so that by operation of said pedal the tube is caused to slide vertically and thereby rotate the control plate 14 in the appropriate direction for moving the gripping elements 8, 9 and 10 inwardly or outwardly as may be desired.

The pedal 22 is normally urged into its fully raised position by means of a spring 23 and in order to balance the spring action I may employ dual springs, one being located on each side of the pedal.

The lower end of the spring 23 may be anchored to a fixed point on the pedal lever 22 but in such an event the resistance to movement of the pedal as the latter approaches the end of its stroke may be so great that difficulty is experienced in fully depressing such pedal. In order to overcome this difficulty the lower end of the spring may be adapted to track along the lever 22 for instance by the provision of connecting means comprising a stirrup 24 and roller 25 and the position of the axis about which the lever 22 pivots may be such that such lever is upwardly inclined when in its fully raised position and downwardly inclined when in its fully depressed position. In the arrangement illustrated the pedal 22 occupies a substantially horizontal position when it is in the mid-position of its stroke, i. e. the upward inclination when such pedal is in the raised position shown in full lines in Figure 1 is substantially equal to the downward inclination when the pedal is in the depressed position shown in chain lines and designated 22' in Figure 1. The spring 23 therefore tends to assume a position in which the distance of separation between the upper end of the spring and the point of contact between the roller 25 and the lever 22 is shortest, i. e. the spring will swing from the full line position shown in Figure 1 to the position shown in chain lines and designated 23' in that figure as the pedal moves from its uppermost to its lowermost position and the resultant elongation of the spring will therefore be much less than would be the case if the spring engaged the pedal at a fixed point. Moreover as the lower end of the spring moves towards the point of pivotal suspension of the lever 22 as such lever is depressed there is an increasing mechanical advantage and this may entirely compensate for the increased elongation of the spring in the sense that movement of the pedal during the latter part of its stroke does not encounter any greatly increased opposition and conversely the pressure urging the gripping elements in a gripping direction is substantially constant irrespective of their position with respect to the platform of the device.

In order to promote the above-described tracking of the spring 23 along the lever 22 the inner end of the latter is preferably pivotally connected to a vertically disposed compensating link 26 and the latter is in turn pivotally connected to the base 1 of the device.

When the above-described device is used, say for removing a tyre from a wheel the pedal 22 is depressed into the position designated 22' in Figure 1 so drawing the tube 19 downwardly into the position designated 19' and thereby causing the shaft 18 and associated control plate 14 to rotate into a position in which the rollers 11, 12 and 13 and the associated gripping elements 8, 9 and 10 are urged outwardly into the positions shown in chain lines and designated 11', 12' and 13', and 8', 9' and 10' respectively. The wheel concerned is then lowered in a horizontal position on to the platform of the device with the tyre resting on the gripping elements 8, 9 and 10. The wheel is then pressed downwardly so that the hook-like extremities of the gripping elements move above the level of the lower part of the wheel rim and the pedal 22 is then released whereupon the gripping elements move inwardly and grip the wheel rim. It will be understood from the foregoing description that the initial separation of the gripping elements and their subsequent release for movement into their gripping positions are effected entirely by foot action and the operator's hands are therefore entirely free for manipulation of the wheel. Moreover the wheel is very securely and rigidly gripped so very greatly facilitating the removal of a tyre and by adopting a stand of about 1' 6" to 2' in height the wheel is supported at a height which is very convenient for the operator.

In general it may be desirable for the pedal 22 to be nearing, although of course not reaching, the upper limit of its movement when a wheel is gripped and in order to deal with wheels of various diameters this means that it may be desirable to vary the positions of the gripping elements with respect to the pedal 22. The arrangement illustrated provides for this variation in that the set screw 7 can be released and the platform 3, 4, can then be rotated so causing the gripping elements to move inwardly or outwardly as may be desired. Moreover after releasing the set screw 7 the platform can be raised or lowered as may be desired and compensation for any undesired radial movement of the gripping elements which may result from this vertical movement of the platform can be obtained by rotating the latter in the appropriate direction before restoring the set screw 7 to its locking position.

Whilst I have hereinbefore described one example of a tyre changing stand according to the present invention I wish it to be understood that there may be various modifications without departing from the scope of such invention. Thus for instance, there may be more or less than three gripping elements and the platform of the device need not necessarily be horizontally disposed. Moreover, the device may be adapted for purposes other than the gripping of wheels during tyre removing and applying operations.

I claim:

1. A gripping and supporting device suitable for supporting vehicle wheels during tire fitting and removing operations comprising a platform on which a wheel can be rested, a plurality of gripping elements movable radially towards and away from the center of said platform so as to grip or release the rim of a wheel as may be desired, a rotary control plate mounted below said platform and having cam-like slots therein, rollers extending upwardly from said gripping elements and making engagement with said cam slots, pedal operated mechanism provided for positively rotating said control plate in one direction and a spring for raising said pedal and thereby resiliently rotating said control plate in the opposite direction, the arrangement of the cam slots being such that rotation of the control plate pursuant to depression of the pedal moves the gripping elements in a gripping direction and rotation pursuant to the raising of the pedal by said spring moves said gripping elements in a releasing direction.

2. A gripping and supporting device suitable for supporting vehicle wheels during tire fitting and removing operations comprising a circular platform, a pedestal upon which said platform is adjustably mounted, gripping elements mounted for radial sliding movement below the upper surface of said platform, hook-like portions extending upwardly from said gripping elements for making engagement with the rim of a vehicle wheel, a rotary control plate mounted coaxially with said platform, a shaft depending from said rotary control plate and entering said pedestal, a sleeve slidably mounted on said shaft, opposed helical slots extending through the wall of said sleeve, a cross-pin passing through said shaft and making engagement with said helical slots, a pedal pivotally connected to said pedestal and making engagement with said sleeve so that depression of said pedal causes said control plate to rotate in one direction and raising of said pedal causes said control plate to rotate in the other direction, spring means for urging said pedal in an upward direction, cam slots in said control plate and rollers carried by said gripping elements and entering said cam slots, the said cam slots being so shaped that rotation of the control plate pursuant to depression of said pedal moves said gripping elements in a releasing direction and rotation of said control plate pursuant to raising of said pedal under the action of said spring means moves said gripping elements in a gripping direction.

3. A gripping and supporting device suitable for supporting vehicle wheels during tire fitting and removing operations comprising a platform, a plurality of gripping elements movable radially towards and away from the center of said platform, spring mechanism for resiliently urging said gripping elements in a gripping direction and positive means operable against the influence of said spring mechanism for moving said gripping elements in a releasing direction, said means for moving said gripping elements in a releasing direction including a fulcrumed pedal; a spring for urging said pedal in an upward direction and thereby urging said gripping elements in a gripping direction, said spring being anchored at one end to a fixed point on the supporting device and at its other end slidably engaging the under side of the pedal so that as the pedal is depressed the point of engagement between it and the spring moves towards the fulcrum about which the pedal lever turns thus compensating for the increased elongation of the spring and resulting in the spring pressure urging the gripping elements in a gripping direction being substantially constant irrespective of variations in the distance of separation of the gripping elements.

HARRY MERRETT.